Aug. 19, 1958
C. L. EKSERGIAN
2,848,073
FRICTION DEVICE SUCH AS A BRAKE
Filed April 17, 1956
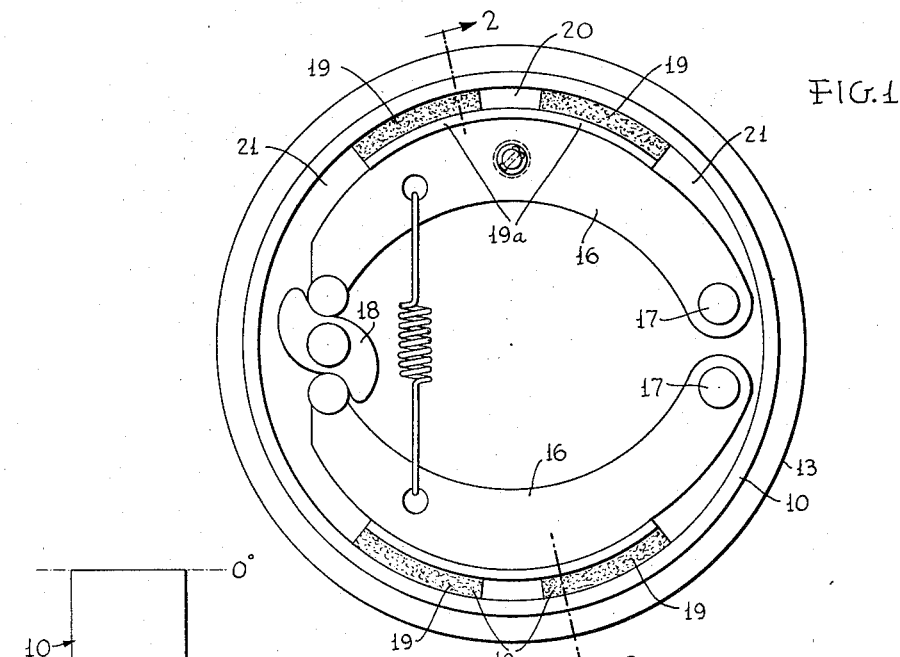
FIG.1
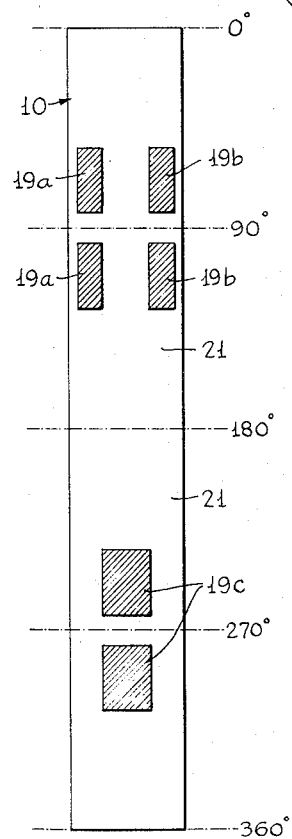
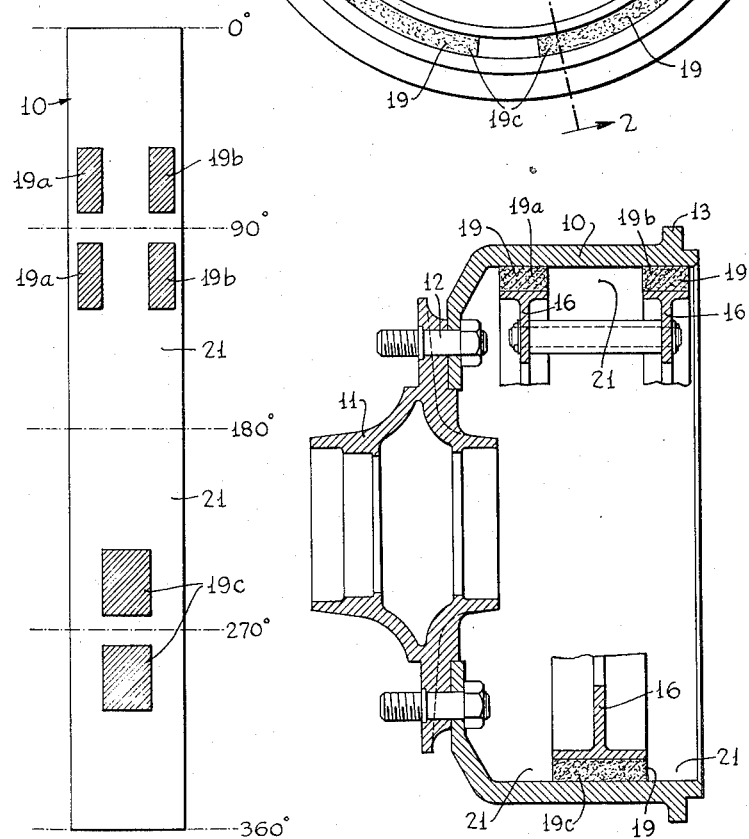
FIG.2
FIG.3
INVENTOR
Carolus L. Eksergian
BY
Wm. R. Glisson
ATTORNEY

2,848,073
FRICTION DEVICE SUCH AS A BRAKE

Carolus L. Eksergian, Media, Pa., assignor to The Budd Company, Philadelphia, Pa., a corporation of Pennsylvania Application April 17, 1956, Serial No. 578,774

8 Claims. (Cl. 188—78)

This invention relates to brakes, especially for automotive road vehicles, and has for an object the provision of improvements in this art. Since clutches in many respects are different from brakes only in function, the invention applies as well to them.

One of the objects of the invention is to obtain the maximum of frictional resistance from two rubbing surfaces of a given area.

Another object is to provide friction surfaces of metallic and non-metallic or composition materials which provide high frictional loadings for continued periods without fade. This is especially applicable to drum type brakes where the braking surfaces are enclosed.

Another object is to provide friction means which include a metallic surface wherein heat checking and subsequent deterioration of the metal surface are avoided.

Another object is to provide a drum type friction device in which the forces are balanced axially and diametrically.

The above and other objects and advantages of the invention will be apparent from the following description of an exemplary embodiment reference being made to the accompanying drawings, wherein:

Fig. 1 is an end elevation of a drum brake assembly embodying the invention, the hub and some other parts being omitted for clarity;

Fig. 2 is an axial section taken on the line 2—2 of Fig. 1, the brake shoe supports and some other parts being omitted for clarity; and Fig. 3 is an unrolled flat plan layout of the arrangement shown in Figs. 1 and 2.

As shown in the drawings, the assembly comprises a drum 10 carried by a hub 11, as through bolts 12. The drum may be shaped on the outer surface for rapid heat dissipation or may be relatively smooth, and preferably is strengthened near the outer end, as by a circumferential cooling and reinforcing rib 13, to prevent bell-mouthing when internal expanding pressure is applied.

A simple form of shoe and lining assembly is shown, that illustrated comprising shoes or supports 16 hinged at 17 and expanded by a cam 18. The shoes are provided with non-metallic or composition lining elements 19.

The brake lining elements 19 are relatively short so as to adjust readily to the curvature of the drum and have open spaces 20 of considerable circumferential length between one element and another element nearest to it. There is a long circumferential space 21 between elements on the distant side. For example, a set or unit of elements 19a (two here) occupies a sector of less than half the rotational zone (circumference here), leaving the other portion 21 open for cooling. In the specific form shown, the lining element unit occupies about 60° of the total circumference of 360°, leaving 300° for heat dissipation.

The rotational zone adjacent a braking unit is left clear for the same open space 21 of half or more of the rotational length, the next lining element group or unit 19b being on the other side of this rotational band. The lining element unit 19c which operates in this intervening band or zone is located on the other side of the axis, or diametrically opposite, from the units 19a and 19b.

The combined area of the lining units 19a, 19b on one side of the axis is approximately equal to the combined area of the unit or units 19c on the other side of the axis so that the braking pressure and friction effects are substantially balanced, both axially and diametrically.

It has been shown by tests that the present arrangement gives improvement in performance over devices formed of like components but with lining which covers a major portion or all of the rotational zone of the metal braking surface. Heat checks and eventual deterioration of the metal surface (usually cast iron) are produced by the old form while the new form does not produce heat checks even after long continued application at the maximum performance rate of the old form prior to fade. This is surprising in view of the fact that the unit pressure on the new form (assuming a 60° arc of contact as against a 360° arc of contact in the old form) may be as much as six times as great as that in the old form. It seems that the rubber resin or other fabric-bonding binder in the non-metallic composition lining will withstand very high temperatures for brief periods but will char or otherwise deteriorate if the heat is maintained for more than a brief period.

It is suggested in theory, but without being committed to any theory of operation, that fast heat transfer through metal requires a very high temperature at the braking surface and a temperature which is as low as possible at the opposite surface, heat flowing faster as the gradient becomes steeper, like water flowing downhill. But a high temperature braking surface is the very cause of fade and brake failure if it is maintained longer than momentarily. The present invention reconciles these contradictory situations by providing relatively short action areas of intense action and relatively long cooling areas. The small active area is subjected to unusually high pressure and attains a high temperature at a very thin surface thickness so as to produce good heat transfer, but the hot area passes away from the lining before there has been time for the lining to be injured. The lining is constantly moving into a zone which has had ample time to cool by heat transfer to air and through the metal and thence to air and related structure. Further, the heat has time to move into the interior of the metal of the drum and away from the lining-engaged surface before there is further engagement by the lining.

The net effect is to attain efficient friction action or braking and to be able to continue the action indefinitely without losing the high coefficient of friction which must be maintained and, in particular, heat checking is minimized. This can be very important with modern high-speed cars with which conventional brakes cannot keep pace.

It is thus seen that the invention provides a highly effective friction system while retaining the general type of equipment which has become more or less standard.

While one embodiment has been disclosed for purposes of illustration, it will be understood that there may be various changes and modifications within the general scope of the invention.

What is claimed is:

1. In a friction resistance device, such as a brake or clutch, in combination, a rotatable friction member having a friction surface providing a plurality of adjacent rotational friction zones, a relatively fixed brake lining unit disposed in each zone for braking action on the friction surface of said rotatable member, the lining units in adjoining zones being circumferentially spaced apart so that there is open space on the side of each lining unit in the adjoining zone, the lining unit in each zone being relatively short in circumferential length to leave an open space of greater circumferential length than the unit in its rotational zone, the lining area on one side of the rotational axis being balanced by lining area of the same size on the other side of the axis, and there being no circumferential overlap of lining on opposite sides of the axis.

2. A friction resistance device as set forth in claim 1, further characterized by the fact that the lining on one side of the axis is disposed in an intermediate zone and that the diametrically opposed lining is disposed in equal areas in two zones outside said intermediate zone.

3. In a friction resistance device, such as a brake or clutch, in combination, a rotatable friction drum member having a friction surface providing a plurality of axially adjacent rotational friction zones, a relatively fixed brake lining unit disposed in each zone for braking action on the friction surface of said rotatable member, the lining units in adjoining zones being circumferentially spaced apart so that there is open space on the side of each lining unit in the adjoining zone, the lining unit in each zone being relatively short in circumferential length to leave an open space of greater circumferential length than the unit in its rotational zone, the lining area on one side of the rotational axis being balanced by lining area of the same size on the other side of the axis, and the lining area on one side of the axis being balanced with the lining area on the other side of the axis about a line disposed at right angles to the rotational axis and to a central diameter through the rotational axis drawn to the mid-length of the opposite units.

4. A friction resistance device as set forth in claim 3, further characterized by the fact that the lining on one side of the axis is disposed in an intermediate zone and that the diametrically opposed lining is disposed in equal areas in two axially spaced zones outside said intermediate zone.

5. In a friction resistance device, such as a brake or clutch, in combination, a rotatable metal friction surface providing space for a plurality of at least three adjacent rotational friction zones, a relatively fixed composition non-metallic friction lining unit in each zone for braking action on the friction surface of said rotatable member, the units in adjoining zones being spaced apart circumferentially to provide open space on the side of each lining unit in the zone adjoining the lining unit, the lining unit in each zone being of relatively short length circumferentially to leave open space in its own zone which is longer circumferentially than the lining unit, the lining units being oppositely disposed and balanced in area at opposite ends of diameters through the axis of rotation, the lining units also being arranged so that the lining area of two units spaced apart by an intermediate open zone area on one side of the axis balances the lining area in the intermediate zone on the other side of the axis.

6. A friction resistance device as set forth in claim 5, in which the lining unit in each zone comprises a plurality of circumferentially spaced pads, each pad on one side of the axis being balanced by a lining pad area of equal size on the other side of the axis.

7. In a friction resistance device, such as a brake or clutch, in combination, a rotatable metal friction drum providing space for a plurality of at least three adjacent circumferential rotational friction zones, a relatively fixed composition non-metallic friction lining unit in each zone for braking action on the friction surface of said rotatable member, the units in adjoining zones being spaced apart circumferentially to provide open space on the side of each lining unit in the zone adjoining the lining unit, the lining unit in each zone being of relatively short length so that it does not circumferentially overlap the lining unit in an adjoining zone, the lining units of two axially spaced zones on one side of the axis being balanced in location and area with the lining unit in the intermediate zone on the other side of the axis, whereby the axial and diametrical forces on opposite sides of the axis are substantially balanced.

8. A friction resistance device as set forth in claim 7, in which the lining unit in each zone comprises a plurality of circumferentially spaced pads, each pad on one side of the axis being balanced by a lining pad area of equal size on the other side of the axis.

References Cited in the file of this patent

UNITED STATES PATENTS

| | | |
|---|---|---|
| 2,016,280 | Gatke | Oct. 8, 1935 |
| 2,384,614 | Forbes | Sept. 11, 1945 |
| 2,661,819 | Strohm | Dec. 8, 1953 |